(12) United States Patent
Ding et al.

(10) Patent No.: US 7,996,749 B2
(45) Date of Patent: Aug. 9, 2011

(54) SIGNAL LOSS DETECTOR FOR HIGH-SPEED SERIAL INTERFACE OF A PROGRAMMABLE LOGIC DEVICE

(75) Inventors: Weiqi Ding, Fremont, CA (US); Sergey Shumarayev, Los Altos Hills, CA (US); Wilson Wong, San Francisco, CA (US); Thungoc M. Tran, San Jose, CA (US); Tim Tri Hoang, San Jose, CA (US)

(73) Assignee: Altera Corporation, San Jose, CA (US)

( * ) Notice: Subject to any disclaimer, the term of this patent is extended or adjusted under 35 U.S.C. 154(b) by 1012 days.

(21) Appl. No.: 11/773,234

(22) Filed: Jul. 3, 2007

(65) Prior Publication Data

US 2009/0011716 A1    Jan. 8, 2009

(51) Int. Cl.
*H03M 13/03* (2006.01)
(52) U.S. Cl. ............ 714/789; 375/232; 327/231
(58) Field of Classification Search .......... 714/789; 327/231; 375/232

See application file for complete search history.

(56) References Cited

U.S. PATENT DOCUMENTS

| 3,496,536 | A  | * | 2/1970  | Wheeler et al. ............. 714/712 |
| 7,447,378 | B2 |   | 11/2008 | Kondo et al. |
| 7,639,737 | B2 | * | 12/2009 | Palmer ..................... 375/232 |
| 2009/0022420 | A1 |   | 1/2009  | Kondo et al. |
| 2009/0237138 | A1 | * | 9/2009  | Shanbhag et al. ........... 327/231 |

FOREIGN PATENT DOCUMENTS

JP    4-169872    6/1992

* cited by examiner

*Primary Examiner* — Sam Rizk
(74) *Attorney, Agent, or Firm* — Ropes & Gray LLP; Jeffrey H. Ingerman

(57) ABSTRACT

A loss-of-signal detector includes digital and analog monitoring of incoming data. The incoming signal is compared digitally to at least one predetermined pattern that may indicate a loss of signal, and also is monitored by an analog detector that detects transitions in the data. If the digital comparison fails to match any of the at least one predetermined pattern, or if transitions are detected by the analog monitoring, even if the digital comparison produces a pattern match, then loss of signal is not indicated.

20 Claims, 2 Drawing Sheets

SIGNAL LOSS DETECTOR FOR HIGH-SPEED SERIAL INTERFACE OF A PROGRAMMABLE LOGIC DEVICE

BACKGROUND OF THE INVENTION

This invention relates to a signal loss detector for clock-data recovery circuitry of a high-speed serial interface, especially in a programmable logic device (PLD).

It has become common for PLDs to incorporate high-speed serial interfaces to accommodate high-speed (i.e., greater than 1 Gbps) serial input/output (I/O) standards. Many of these standards can operate at more than one clock rate. However, it is a common feature of most if not all high-speed serial data protocols that neither the clock nor information about the clock is sent with the data. Instead, the clock must be recovered from the data.

For this purpose, it is known to use "clock-data recovery" techniques in high-speed serial interfaces. Such techniques recover the clock from serial data using a closed-loop feedback system including, e.g., a phase-locked loop or delay-locked loop.

It should be apparent that any such data interface must be able to detect when it has lost its lock on the incoming data signal. For example, under the PCI-Express Generation II protocol (PCIe2), a receiver is required to flag signal loss when the input data amplitude is below 100 mV (peak-to-peak). Under PCIe2, the transceiver enters an idle state upon detecting signal loss. The transceiver further is required to exit, or recover, from the idle state quickly upon detecting an input signal above 100 mV (peak-to-peak). These requirements are challenging when using analog circuits, particularly considering that the data rate exceeds 1 Gbps and may be around 5 Gbps, and that the absolute magnitudes of signal voltages continue to decrease. For example, early signal detectors rectified the incoming signal with a diode, causing a voltage drop of 0.7 V (700 mV) which is much greater than the PCIe2 detection threshold. Even with more advanced analog detectors, which may include operational amplifiers instead of diodes, high-speed, low-voltage threshold detection is difficult.

Therefore, it has become common to use digital techniques to compare the incoming data to the set of possible legal data patterns, rather than relying on signal levels. If the data do not match any of those patterns, then the signal is considered to have been lost. Alternatively, or in addition, the signal may be compared to known illegal data patterns which, if present, indicate loss of signal.

However, in systems that include CDR circuitry, the CDR circuitry itself may output data with an apparent pattern which may mimic a legal data pattern. Indeed, that pattern may be suspect in most cases, but legal in other cases. For example, the phase detector in the loop circuit of CDR circuitry may output an alternating pattern of 1's and 0's, which is a suspect pattern because it may indicate that the circuit is caught in a loop, but which also is a legal pattern under the PCIe2 protocol. Therefore, an interface operating under PCIe2, for example, may not be able to detect loss of signal if it results in that pattern.

Accordingly, it would be desirable to be able to provide more reliable signal loss detection.

SUMMARY OF THE INVENTION

In accordance with the present invention, the CDR output preferably is monitored on two paths to detect loss of signal. One path preferably is a digital path which looks for a particular pattern or patterns that may indicate signal loss (but some of which also may be legal). The other path preferably is an analog path that indicates signal loss unless the data signal includes a large number of transitions, such as may be present when the data are legal. Signal loss preferably is inferred only when both paths indicate signal loss.

Thus, in accordance with the present invention there is provided a signal status detector including a digital data pattern detector that compares incoming data to at least one predetermined data pattern and provides a first loss-of-signal indication based on whether the incoming data match any one of said at least one predetermined data pattern. The signal status detector also includes an analog detector that outputs a second loss-of-signal indication based upon presence or absence of a plurality of transitions in the incoming data. A decision circuit outputs a third loss-of-signal indication based on said first and second loss-of-signal indications.

A serial interface incorporating the signal status detector, and a programmable logic device incorporating that serial interface, also are provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

As described above, digital detection of signal loss, by comparing incoming data to known patterns which may indicate signal loss, is preferred, particularly as signal voltages decrease (which is a consequence of decreasing integrated circuit device feature size). However, as also described above, a pattern that is a sign of signal loss also may be a legal pattern in some cases. One of those cases is an alternating 1-0 pattern (i.e., "01010101 . . . " or "10101010 . . . ") under the PCI-Express protocol.

In accordance with the present invention, a legal instance of such a pattern can be distinguished from an instance of that pattern indicating signal loss by whether or not analog transitions are detected. Specifically, in double data rate operation, where data is sampled on both rising and falling clock edges, even and odd data samples are produced by different comparators. If the comparators are operating identically, a loss of signal pattern where the data are all 1's or all 0's will be indicated as a continuous "1" or "0" output. However, if one comparator is offset relative to the other, a pattern that should be a continuous "1" or a continuous "0" can appear as alternating 1's and 0's.

Therefore, in accordance with a preferred embodiment of the invention, incoming data are compared in a digital path to one of the four possible suspect patterns known to indicate loss of signal—i.e., all 0's or all 1's (where there is no comparator offset) or alternating 1's and 0's, or 0's and 1's (where there is a comparator offset). However, because the latter two patterns may be legal, such as under PCIe, the data preferably also are compared using an analog path. The analog path preferably will indicate a match only after a relatively large number of transitions which signifies that the data in fact are toggling, and that the alternating data pattern is not the result of a combination of a stuck pattern and comparator offset. Loss of data preferably is indicated only when both paths indicate loss of data.

Figure 1:
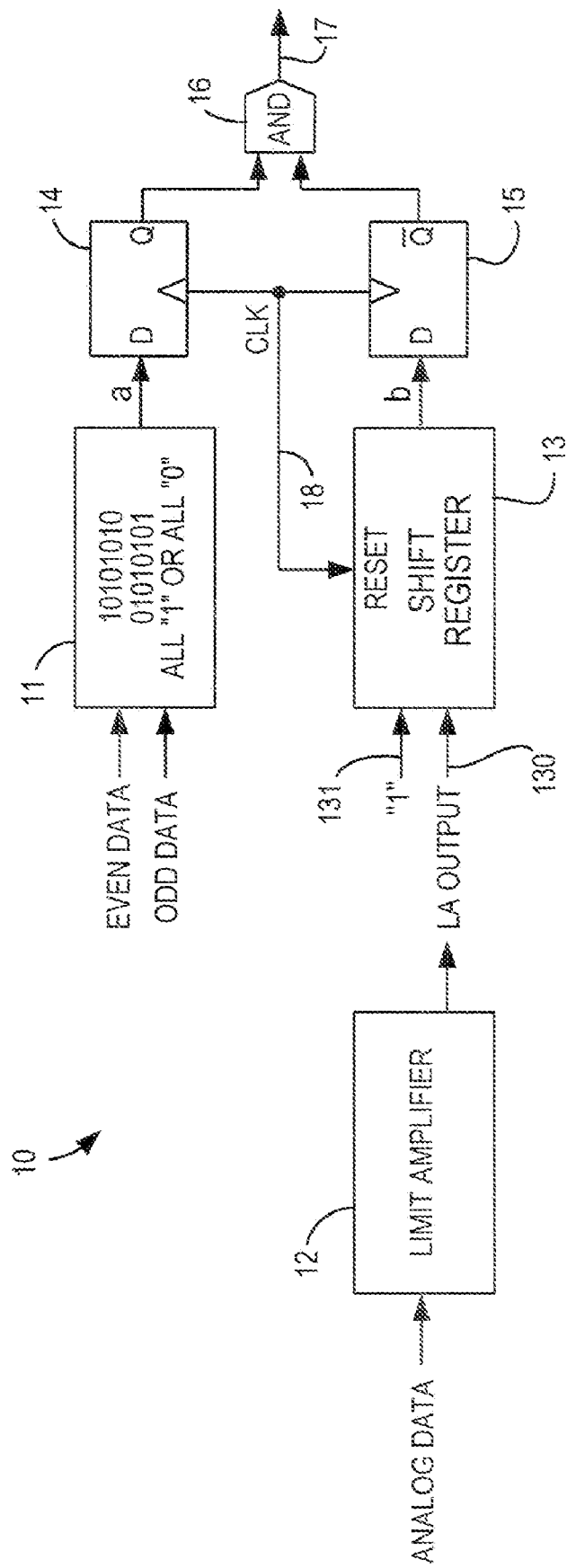
FIG. 1 is a schematic representation of a signal status detector in accordance with a preferred embodiment of the present invention.

The invention will now be described with reference to FIG. 1, which shows loss-of-signal circuitry 10 in accordance with a preferred embodiment of the invention. Digital pattern detector 11 produces an output "a", while analog limit amplifier 12 drives shift register 13 to drive a "1" to output "b" after a sufficient number of transitions in the data. Outputs "a" and "b" preferably are registered in flip-flops 14, 15. The Q output of flip-flop 14 and the nQ output of flip-flop 15 preferably are combined in AND gate 16 to produce output 17 of circuitry 10.

Digital pattern detector 11 preferably outputs a "1" on the occurrence of any of the following four patterns:
 1. 1010101010 . . . ;
 2. 0101010101 . . . ;
 3. 1111111111 . . . ; or
 4. 0000000000 . . . ,
any of which could indicate "stuck" data—i.e., a loss of signal—for the reasons discussed above. For reasons also discussed above, presence of those patterns—and particularly the presence of either of the 1-0 alternating patterns when operating under PCIe—is not conclusive. However, as discussed above, when those patterns occur legally, one would expect transitions in the analog data.

Therefore, preferably the data also are passed through analog limit amplifier 12 whose output preferably drives clock input 130 of shift register 13, shifting in 1's from input 131. Shift register 13 preferably is initialized to all 0's. Thus, a "1" will appear at output "b" only after a large number of 1-0 or 0-1 transitions in the data, meaning that the data have been toggling sufficiently to indicate actual data rather than a stuck pattern—i.e., loss of signal. The number of transitions required to obtain a "1" at output "b" can be determined by the length of shift register 13. Shift register 13, as well as flip-flops 14, 15 are periodically reset by signal 18 to "0". The interval between resets is determined by the user according to the desired sensitivity of detector circuitry 10. For example, the interval can be between about 10 and about 20 bits (i.e., about 5 to about 10 clock cycles in double-data-rate operation). In a programmable logic device, both the length of shift register 13 and the interval between resets preferably are programmable as part of the user's logic design.

As can be seen, if digital pattern detector 11 outputs a "1" at "a", then flip-flop 14 will output a "1" as one input to AND gate 16. Similarly, if shift register 13 outputs a "0", then flip-flop 15 will output a "1" as the other input to AND gate 16. A "1" at output 17 preferably indicates loss of signal.

Thus, if pattern detector 11 does not detect one of the four suspect patterns, output "a" remains "0" and therefore output 17 remains "0" regardless of the state of output "b", meaning the data are legal. If pattern detector 11 does detect one of the four suspect patterns, output "a" becomes "1", and the status of output 17 is determined by output "b". In that case, if no transitions are detected in the analog data, output "b" remains "0", making both inputs to AND gate 16 "1" and indicating loss of signal. But if transitions are detected in the analog data, meaning that the data are legal, output "b" becomes "1", meaning that even though output "a" is "1" signifying possible signal loss, the other input to AND gate 16 is "0" so that output 17 remains "0" and signal loss is not indicated.

Figure 2:
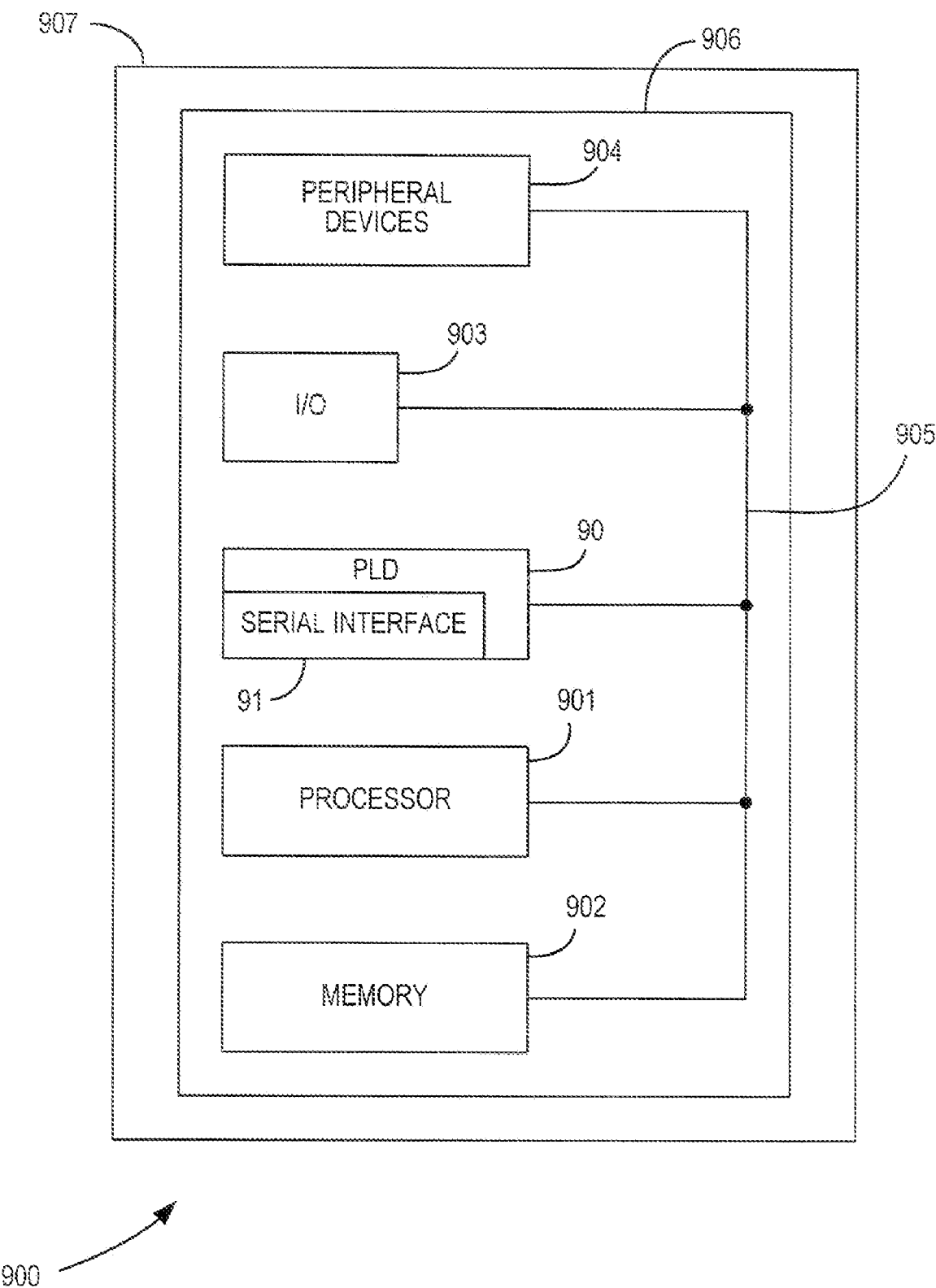
FIG. 2 is a simplified block diagram of an illustrative system employing a programmable logic device incorporating a signal status detector in accordance with the present invention.

Thus it is seen that a signal status detector that can distinguish between legal and illegal patterns of alternating 1's and 0's to provide a loss-of-signal indication has been provided. A signal status or loss-of-signal detector in accordance with the present invention may be provided, as discussed above, in a serial interface 91 of a PLD 90 (see FIG. 2).

A PLD 90 incorporating the present invention may be used in many kinds of electronic devices. One possible use is in a data processing system 900 shown in FIG. 8. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A loss-of-signal detector comprising:
a digital data pattern detector that compares incoming data to at least one predetermined data pattern and provides a first loss-of-signal indication based on whether said incoming data match any one of said at least one predetermined data pattern;
an analog detector that outputs a second loss-of-signal indication based upon presence or absence of a plurality of transitions in said incoming data; and
a decision circuit that outputs a third loss-of-signal indication based on said first and second loss-of-signal indications.

2. The loss-of-signal detector of claim 1 wherein:
when said first loss-of-signal indication indicates that said incoming data do not match any one of said at least one predetermined pattern, said decision circuit outputs said third loss-of-signal indication in a state indicating presence of signal.

3. The loss-of-signal detector of claim 1 wherein:
when said first loss-of-signal indication indicates that said incoming data match one of said at least one predetermined pattern, said decision circuit outputs said third loss-of signal indication based on status of said second loss-of-signal indication.

4. The loss-of-signal detector of claim 3 wherein:
when said second loss-of-signal indication indicates presence of a plurality of transitions in said incoming data, said decision circuit outputs said third loss-of-signal indication in a state indicating presence of signal; and
when said second loss-of-signal indication indicates absence of a plurality of transitions in said incoming data, said decision circuit outputs said third loss-of-signal indication in a state indicating loss of signal.

5. The loss-of-signal detector of claim 1 wherein:
said analog detector comprises a shift register coupled to a source of signal indicating presence of transitions; and
said incoming data are provided to a clock input of said shift register; whereby:
transitions in said incoming data shift said signal indicating presence of transitions to an output of said shift register.

6. The loss-of-signal detector of claim 5 wherein said analog signal detector further comprises an analog amplifier through which said incoming data are provided to said clock input of said shift register.

7. The loss-of-signal detector of claim 1 wherein said decision circuit comprises an AND gate to which said first and second loss-of-signal indications are provided as inputs.

8. The loss-of-signal detector of claim 7 further comprising a respective register through which said respective first and second loss-of-signal indications are provided to said AND gate as inputs.

9. The loss-of-signal detector of claim 8 wherein one of said registers inverts its respective one of said first and second loss-of-signal indications.

10. The loss-of-signal detector of claim 9 wherein said second loss-of-signal indication is inverted by said one of said registers.

11. A serial interface comprising the loss-of-signal detector of claim 1.

12. A programmable logic device comprising the serial interface of claim 11.

13. A printed circuit board on which is mounted a programmable logic device as defined in claim 12.

14. The printed circuit board defined in claim 13 further comprising:
memory circuitry mounted on the printed circuit board and coupled to the programmable logic device.

15. The printed circuit board defined in claim 14 further comprising:
processing circuitry mounted on the printed circuit board and coupled to the memory circuitry.

16. A method for detecting loss-of-signal in a serial data interface, said method comprising:
comparing even samples of incoming data to a threshold using a first comparator and odd samples of said incoming data to said threshold using a second comparator, to generate a pattern of incoming data;
comparing said pattern of incoming data to at least one predetermined data pattern, and providing a first loss-of-signal indication based on whether said incoming data match any one of said at least one predetermined data pattern;
generating a second loss-of-signal indication based upon presence or absence of a plurality of transitions in said incoming data; and
outputting a third loss-of-signal indication based on said first and second loss-of-signal indications.

17. The loss-of-signal detection method of claim 16 wherein:
when said first loss-of-signal indication indicates that said incoming data do not match any one of said at least one predetermined pattern, said third loss-of-signal indication indicates presence of a signal.

18. The loss-of-signal detection method of claim 16 wherein:
when said first loss-of-signal indication indicates that said incoming data match one of said at least one predetermined pattern, said third loss-of signal indication is based on a status of said second loss-of-signal indication.

19. The loss-of-signal detection method of claim 18 wherein:
when said second loss-of-signal indication indicates presence of a plurality of transitions in said incoming data, said third loss-of-signal indication indicates presence of a signal; and
when said second loss-of-signal indication indicates absence of a plurality of transitions in said incoming data, said third loss-of-signal indication indicates loss of a signal.

20. A loss-of-signal detector for use with a serial data interface for which there is at least one suspect data pattern that is, at different times, (a) a legal pattern and (b) an indication of signal loss, said loss-of-signal detector comprising:
a digital data pattern detector that (1) compares incoming data to at least one predetermined data pattern and (2) provides a first loss-of-signal indication based on whether said incoming data match any one of said at least one predetermined data pattern;
an analog detector that outputs a second loss-of-signal indication based upon presence or absence of a plurality of transitions in said incoming data; and
a decision circuit that outputs a third loss-of-signal indication based on said first and second loss-of-signal indications.

* * * * *